(12) United States Patent
Paillarse

(10) Patent No.: US 9,797,757 B2
(45) Date of Patent: Oct. 24, 2017

(54) DEVICE FOR MEASURING THE INTERNAL PROFILE OF A HOLLOW SHAFT

(71) Applicant: SNECMA, Paris (FR)

(72) Inventor: Bernard Philippe Jacques Paillarse, Corbeil Essonnes (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/760,097

(22) PCT Filed: Jan. 16, 2014

(86) PCT No.: PCT/FR2014/050084
§ 371 (c)(1),
(2) Date: Jul. 9, 2015

(87) PCT Pub. No.: WO2014/111660
PCT Pub. Date: Jul. 24, 2014

(65) Prior Publication Data
US 2015/0354994 A1    Dec. 10, 2015

(30) Foreign Application Priority Data
Jan. 17, 2013 (FR) ...................................... 13 50406

(51) Int. Cl.
*G01D 11/02* (2006.01)
*G01B 11/24* (2006.01)
(Continued)

(52) U.S. Cl.
CPC .............. *G01D 11/02* (2013.01); *G01B 5/12* (2013.01); *G01B 5/201* (2013.01); *G01B 7/13* (2013.01);
(Continued)

(58) Field of Classification Search
CPC ........ G01D 11/02; G01D 11/16; G01B 11/24; G01B 11/026; G01M 15/14
See application file for complete search history.

(56) References Cited

U.S. PATENT DOCUMENTS 3,958,337 A    5/1976    Anichini
4,290,204 A    9/1981    Possati
(Continued)

FOREIGN PATENT DOCUMENTS

CH    692 308 A5    4/2002
DE    3219677 A1 *  11/1983    ............. H01B 13/08
(Continued)

OTHER PUBLICATIONS

International Search Report dated May 15, 2014, in PCT/FR2014/050084, filed Jan. 16, 2014.
(Continued)

*Primary Examiner* — Sang Nguyen
(74) *Attorney, Agent, or Firm* — Oblon, McClelland, Maier & Neustadt, L.L.P.

(57) ABSTRACT

A sensor is placed on a plate lowered into the hollow of the shaft and guided by taut wires between a lower attachment device and an upper motorized winder. The deformations, responsible for measurement errors and caused either by static deformations, produced by the weight or poor construction of the apparatus, or by vibrations, are to a large extent eliminated.

19 Claims, 4 Drawing Sheets

(51) Int. Cl.
*G01M 15/14* (2006.01)
*G01D 11/16* (2006.01)
*G01B 5/12* (2006.01)
*G01B 5/20* (2006.01)
*G01B 7/13* (2006.01)
*G01B 7/28* (2006.01)
*G01B 11/12* (2006.01)

(52) U.S. Cl.
CPC .............. *G01B 7/282* (2013.01); *G01B 11/12* (2013.01); *G01B 11/24* (2013.01); *G01B 11/2408* (2013.01); *G01D 11/16* (2013.01); *G01M 15/14* (2013.01)

(56) References Cited

U.S. PATENT DOCUMENTS

| | | | | |
|---|---|---|---|---|
| 4,963,018 | A * | 10/1990 | West | G01B 11/026 250/236 |
| 4,967,092 | A * | 10/1990 | Fraignier | G01B 11/24 250/559.07 |
| 6,931,748 | B2 * | 8/2005 | Lam | G01B 11/105 33/542 |
| 9,127,803 | B2 * | 9/2015 | Krywyj | |
| 2003/0234111 | A1 * | 12/2003 | Echols | E21B 17/1014 166/382 |
| 2013/0098525 | A1 * | 4/2013 | Aumueller | B29C 43/28 156/64 |

FOREIGN PATENT DOCUMENTS

| | | |
|---|---|---|
| FR | 2 249 311 A1 | 5/1975 |
| FR | 2 443 047 A1 | 6/1980 |
| WO | WO 9910708 A1 | 3/1999 |

OTHER PUBLICATIONS

French Preliminary Search Report dated Oct. 8, 2013, in Patent Application No. FR 13 50406, filed Jan. 17, 2013.

* cited by examiner

DEVICE FOR MEASURING THE INTERNAL PROFILE OF A HOLLOW SHAFT

BACKGROUND OF THE INVENTION

Field of the Invention

The subject of this invention is a device for measuring the internal profile of a hollow shaft, which makes it possible to measure the radius irregularities of the hollow of this shaft over successive circumstances.

Description of the Related Art

Such measurements are taken on turbomachine rotor shafts, generally concurrently to measurements of the outer profile, in such a way as to in particular know the concentricity of the outer and inner surfaces of these shafts.

Certain difficulties with these measurements stem from the necessity of their precision and of the great length of the shafts. Sensors without contact with the surface of the blade are generally preferred, in order to avoid possibilities of errors dues to forces of contact and deformations. The shaft must be in a non-deformed condition, in such a way that it is attached vertically to a frame, and the measurements are therefore taken by progressively pushing the sensor into the hollow, after having raised it above the upper end of the shaft. In prior art, the sensor is attached to the lower end of a tubular rod, able to be made of carbon and which is slide into the hollow of the shaft. It is however difficult to guarantee the absence of deformations of the rod, and therefore the absence of measurement errors stemming from an incorrect radial position of the sensor. Another disadvantage that is encountered is that the rod must be at least as long as the shaft and must be lifted above it in order to introduce the sensor, which results in substantial vertical encumbrance of the whole.

The difficulties are more substantial with certain thin and long shafts (2.5 m, for example), which are now proposed in certain machines: the vertical encumbrance of the whole is obviously increased, and it is becoming genuinely difficult to design a rod that remains rigid enough, especially at the finesse to which it is restricted. It is to obviate these difficulties that the invention was designed. It consists in replacing the support and guide rod with another device that is more convenient and less massive and bulky, but paradoxically more rigid.

BRIEF SUMMARY OF THE INVENTION

In a general form, the invention relates to a device for measuring the internal profile of a hollow shaft, comprising a frame to which the shaft is attached vertically, a measuring machine comprising at least one sensor and a support of the sensor mobile vertically in the hollow of the shaft, characterised in that it further comprises at least one wire vertically taut through the hollow of the shaft, and the support of the sensor consists in a plate provided with at least one bore, with each taut wire being threaded into a respective bore, the plate being mobile along the taut wire.

In a particular embodiment, the plate can be suspended from a descending wire arranged on a winder; other modes of displacement are possible.

The taut wires can have a length that is hardly greater than that of the shaft and their tension guarantees them against the deflections that could be produced, for example, by the surrounding vibrations that can be generated by the activity of the device. The lateral movements of the plate, which would be responsible for measurement errors, are very limited. The taut wires can be installed using heights that are hardly greater than that of the shaft, which requires a reduced vertical encumbrance of the device.

Additional rigidity, as well as an even greater precision of the position of the sensor, are obtained if the device comprises several of these taut wires, arranged parallel to each other. As such a device with two taut wires can be advocated, of which the bores of the plate that they pass through are opposite on this plate, or a device with three taut wires, of which the bores that they pass through are evenly distributed around the plate.

An interesting characteristic for the insertion of the taut wire or wires into the hollow of the shaft comprises a weight suspended from the taut wires and a blocking device of this weight at a bottom position, with this blocking device being located on the frame. It is sufficient, indeed, to lower the weight into the hollow of the shaft to drive the taut wires, while still keeping them in the correct position, as soon as the blocking device has entered into action. The weight can be unique and common to all of the wires.

This device can be mechanical or electromagnetic, for example constituted by an electro-magnet, with the weight then being made of magnetic material.

The correct position of the wires is then guaranteed, if the locking device comprises a centring imprint receiving the weight. It is sufficient to choose a weight and an imprint of which the respective shapes allow for this centring. The weight can as such be a sphere, which will be inserted into an imprint of spherical or conical shape, for example.

In order to provide the tension of the wires, the device can further comprise a means of suspending and of tensioning the wire to the frame. When several wires are present, they can each be provided with such a means independent of the others, in such a way as to make it possible to adjust the tensions to different values for each one of the taut wires: this arrangement has the advantage of reducing the vibrations applied to the plate, thanks to the dissymmetry created as such.

The blocking device can be mounted on a rotating plate of the frame, which is a support of the shaft, by a bearing rotating freely about a vertical axis of said blocking device. Indeed, the measurements are generally taken by rotating the shaft in front of the sensor. The blocking device must be detached from this plate, in the centre of which it is located.

Each bore for the passing of a taut wire can advantageously be provided with a sliding ring without slack on this wire, again in order to prevent lateral movements of the support plate of the sensor. This can be achieved with split rings with a hemispheric section. PTFE is a suitable material for reducing the friction to values that authorise the lowering of the support plate along wires under its own weight.

The measuring machine can be supplemented by a device for measuring the unwinding of the descending wire, which therefore indicates the height of the sensor.

Until now only a single sensor has been considered in this device. They can in reality be of any number, and there will even be several in general, but this is indifferent for the carrying out of the invention. The sensors can themselves be of varied types. Optical sensors of which the measurements are expressed by gradients of colours can as such be considered, but other types of sensors, electromagnetic or others, can be considered. Sensors measuring other parameters than distance to the internal profile of the shaft could also be used in the invention.

BRIEF DESCRIPTION OF THE SEVERAL VIEWS OF THE DRAWINGS

The invention shall now be described in more detail by means of the following figures, which are annexed purely for the purposes of information.

DETAILED DESCRIPTION OF THE INVENTION

Figure 1:
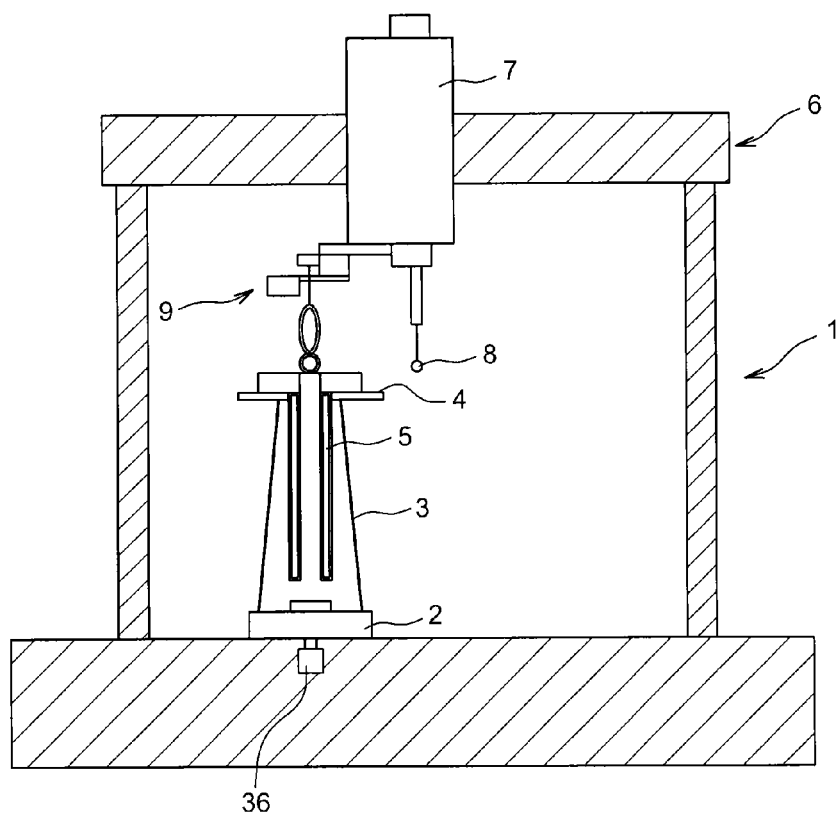
FIGS. 1 and 2 show in general two embodiments of the device in accordance with the invention.

FIG. 1 shows in general a first embodiment of the invention. A fixed frame 1 comprises a rotating plate 2, provided with a support 3 narrowing upwards, at a top face 4 from which a shaft 5 to be measured is suspended. The shaft 5 is placed vertically, in such a way as to not bend under its weight the plate 2, the support 3 and the shaft 5 rotate under the action of a motor 36.

The frame 1 further comprises an arc 6 erected above the support 3 and which bears a three-dimensional measuring machine (3DMM) 7, intended to measure the shaft 5 and of which the largest portion is known. It can comprise, in addition to the sensor of the invention, an outer profile sensor 8 that can consist of a laser for measuring the outer profile of the shaft 5. The invention relates rather to a device 9 for measuring the inside of the shaft 5. In this embodiment, the device 9 is mounted on the 3DMM 7 via an overhanging arm, while in the embodiment of FIG. 2, it is attached to a jib 10 that belongs to the frame 1, but independent of the arc 6, which has the advantage of not loading the 3DMM 7. The rest of the construction is not changed. The device 9 shall now be described by means of FIG. 3 primarily.

Figure 6:
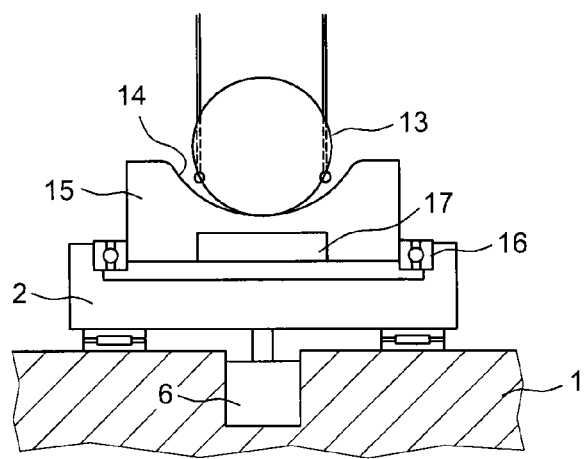
FIG. 6 shows the bottom of the device.

It comprises two parallel vertical taut wires 11 and each extending from top to bottom from a respective winder 12, to a common weight 13 (shown in FIG. 6), through the entire hollow of the shaft 5. The weight 13 is a magnetic sphere placed in an imprint 14, also spherical, of the shell of an electro-magnet 15. The electro-magnet 15 extends over the rotating plate 2, to which it is united via a bearing 16 allowing for relative rotation: when the motor 36 rotates and drives the rotating plate 2, the electro-magnet 15 can remain immobile, as well as the magnetic sphere, when the windings 17 of the electro-magnet 15 are excited in order to maintain it with a rather important force at the bottom of the imprint 14. The spherical shape of the imprint 14 ensures that the weight 13 remains concentric to the electro-magnet 15, to the rotating plate 2 and to the shaft 5.

Figure 2:
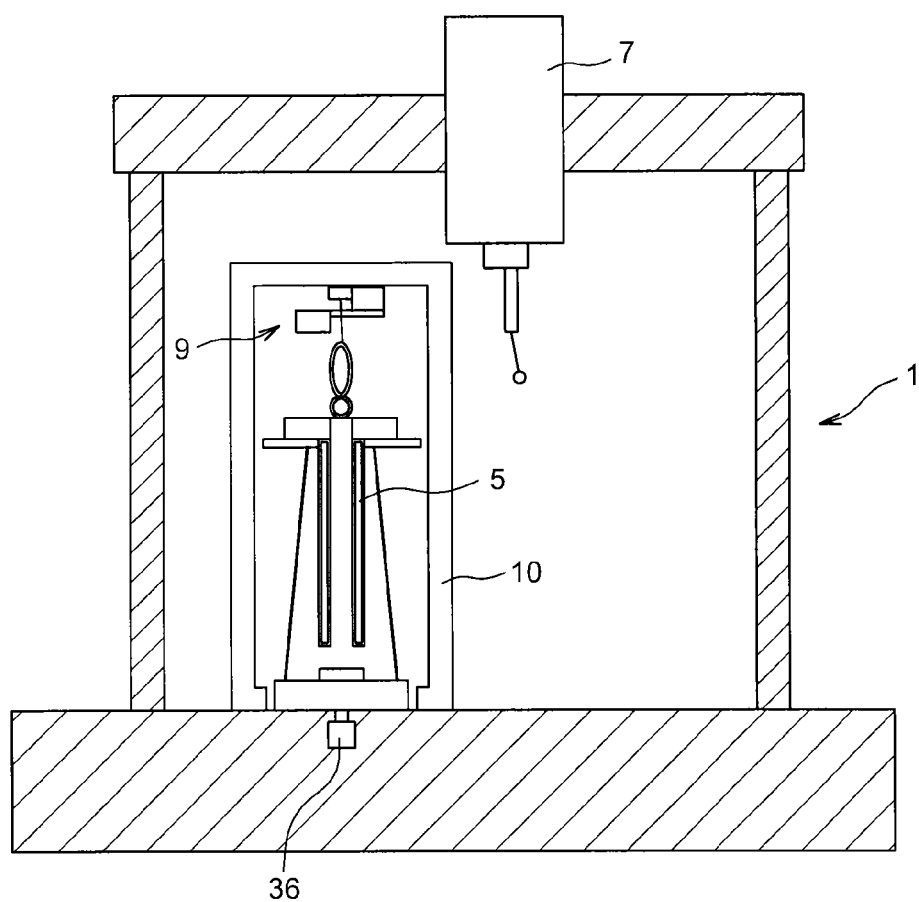
Figure 3:
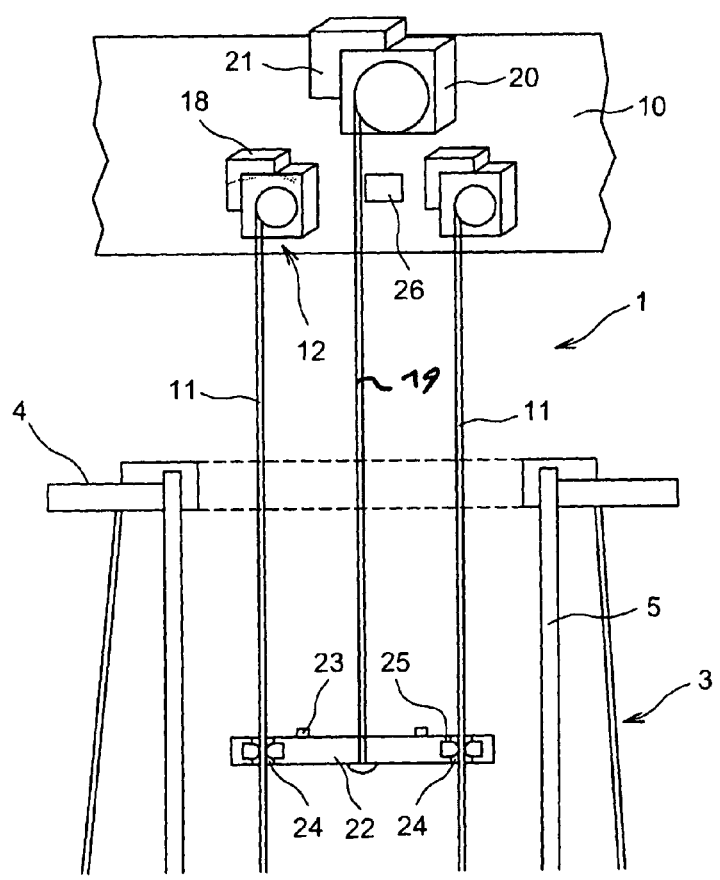
FIG. 3 shows elements adjacent to the sensor.

The winders 12 are controlled by independent motors 18, in such a way as to tension the wires 11, which are moreover suspended from the frame 1 (by the intermediary of the jib 10 or of the 3DMM 7 in the embodiments of FIGS. 2 and 1). The value of the tension can be made to be rather substantial without risk, thanks to the electromagnetic force for maintaining the weight 13. The tensions can advantageously be different, so that this dissymmetry complicates the appearance of vibrations in the device 9. The forces applied by the motors 18 and which are responsible for the tension of the wires 11, can be adjusted by the intermediary of clutches not shown, and provided with torque transmission limits. The taut wires 11 can consist of steel piano wires.

There is another wire in the device 9, which is a descending wire 19 that depends on another winder 20, which is itself also controlled by a motor 21. The descending wire 19 supports a plate 22, carrying sensors 23, measuring their distance to the inner face of the shaft 5.

Figure 4:
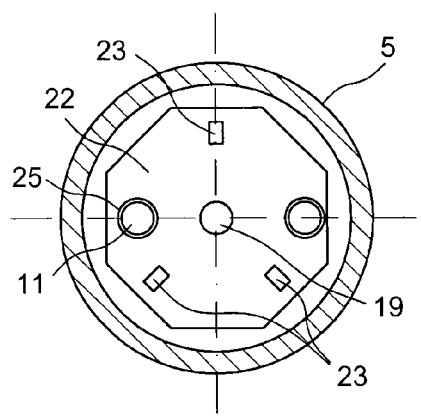
FIGS. 4 and 5 show two possible embodiments of the sensor-carrier plate.

FIG. 4 shows that three sensors 23 can be used, spaced at 120°. The number of sensors 23 is irrelevant, since the measurements are in any case provided by the rotation of the shaft 5, of which the circumferences pass in front of each one of them. The taut wires 11 pass through respective bores 24 that pass through the plate 22 and which are opposite on this plate 22. Sliding rings 25 without slack are retained in the bores 24 and rub on the surface of the taut wires 11. Their section is hemispheric with the rounded edge directed towards the taut wire 11, and they are split (the circumference is interrupted) in such a way as to be able to adapt to the variations in diameter of the taut wires 11. They are made of PTFE.

When the descending wire 19 is unwound, the friction of the rings 25 on the taut wire 11 is low enough so that the sliding is possible and that the plate 22, carrying the sensors 23, is effectively lowered. The movements of the descending wires 19 can be followed by another sensor 26, which, for example, measures the passing of the graduations of the descending wire 19, and which communicates with the 3DMM 7.

Figure 5:
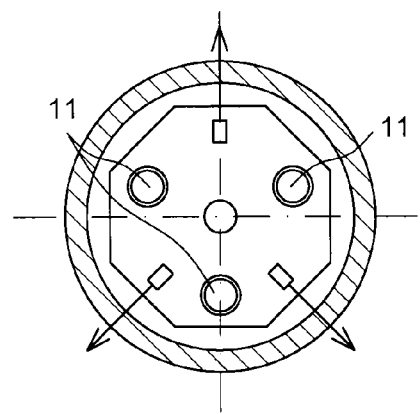

The measurement is taken by lowering the plate 22 to the bottom of the shaft 5 and by raising it progressively, while placing the sensors 23 in operation and by rotating the shaft 5. The choice of an ascending pass for the measurements can be explained in that the rising movement of the plate 22 is more stable than that of lowering, which produces fewer vibrations which would disturb the measurements. Other reasons for which these vibrations are reduced are the tension applied to the wires 11, as well as the suppression of the slack between them and the plate 22, thanks to the rings 25. Finally, the plurality of taut wires 11 further contributes to stabilising the position of the plate 22 and of the sensors 23, even if a device, which would comprise a single taut wire 11, is not excluded from the invention. With regards to this subject, FIG. 5 shows another favourable embodiment, which would comprise three taut wires 11, distributed at 120° around the plate 22 in as many bores 24.

The invention claimed is:

1. A device for measuring the internal profile of a hollow shaft, comprising:

a frame to which the shaft is vertically attached;

a measuring machine comprising at least one sensor and a support of the sensor which is mobile vertically in the hollow of the shaft;

at least one taut wire vertically through the hollow of the shaft; and a weight suspended from the at least one taut wire, wherein the support of the sensor comprises a plate provided with at least one bore, with each taut wire being threaded into a respective bore, the plate being mobile along the taut wire, and wherein the frame comprises a blocking device of the weight at a bottom position.

2. The device for measuring the internal profile of a hollow shaft according to claim 1, wherein the blocking device is an electro-magnet, with the weight being magnetic.

3. The device for measuring the internal profile of a hollow shaft according to claim 1, wherein the blocking device comprises a centring imprint that receives the weight.

4. The device for measuring the internal profile of a hollow shaft according to claim 1, wherein the weight is a sphere.

5. The device for measuring the internal profile of a hollow shaft according to claim 1, wherein the blocking device is mounted on a rotating plate of the frame, which receives a support of the shaft, by a bearing rotating freely about a vertical axis of said blocking device.

6. A device for measuring the internal profile of a hollow shaft, comprising:

a frame to which the shaft is vertically attached;

a measuring machine comprising at least one sensor and a support of the sensor which is mobile vertically in the hollow of the shaft; and at least one taut wire vertically through the hollow of the shaft, the taut wire comprising opposite ends which are secured to the frame, wherein the support of the sensor comprises a plate provided with at least one bore, with each taut wire being threaded into a respective bore, the plate being mobile by sliding along the taut wire.

7. The device for measuring the internal profile of a hollow shaft according to claim 6, comprising two said taut wires, and the bores are opposite on the plate.

8. The device for measuring the internal profile of a hollow shaft according to claim 6, comprising three said taut wires, and the bores are distributed regularly around the plate.

9. The device for measuring the internal profile of a hollow shaft according to claim 6, comprising a weight suspended from at least one taut wire, and the frame comprises a blocking device of the weight at a bottom position.

10. The device for measuring the internal profile of a hollow shaft according to claim 9, wherein the blocking device is an electro-magnet, with the weight being magnetic.

11. The device for measuring the internal profile of a hollow shaft according to claim 9, wherein the blocking device comprises a centring imprint that receives the weight.

12. The device for measuring the internal profile of a hollow shaft according to claim 9, wherein the weight is a sphere.

13. The device for measuring the internal profile of a hollow shaft according to claim 9, wherein the blocking device is mounted on a rotating plate of the frame, which receives a support of the shaft, by a bearing rotating freely about a vertical axis of said blocking device.

14. The device for measuring the internal profile of a hollow shaft according to claim 6, comprising a means of suspending and of tensioning the wire to the frame.

15. The device for measuring the internal profile of a hollow shaft according to claim 14, wherein the device comprising several said taut wires, the means of suspending and of tensioning is independent for each one of said taut wires such that different tensions are applied to said taut wires.

16. The device for measuring the internal profile of a hollow shaft according to claim 6, wherein the bore is provided with a sliding ring without slack on the taut wire.

17. The device for measuring the internal profile of a hollow shaft according to claim 16, wherein the ring is split and has a hemispheric section.

18. The device for measuring the internal profile of a hollow shaft according to claim 6, comprising a sensor for measuring the unwinding of the descending wire.

19. The device for measuring the internal profile of a hollow shaft according to claim 6, wherein the plate is suspended from a descending wire arranged on a winder.

\* \* \* \* \*